Nov. 18, 1958

M. TRESHOW 2,861,033

HORIZONTAL BOILING REACTOR SYSTEM

Filed April 26, 1956

INVENTOR.
Michael Treshow
BY
Roland A. Anderson
Attorney

Nov. 18, 1958

M. TRESHOW 2,861,033

HORIZONTAL BOILING REACTOR SYSTEM

Filed April 26, 1956

INVENTOR.
Michael Treshow
BY
Roland A. Anderson
Attorney

Nov. 18, 1958
M. TRESHOW
2,861,033
HORIZONTAL BOILING REACTOR SYSTEM
Filed April 26, 1956
6 Sheets-Sheet 3
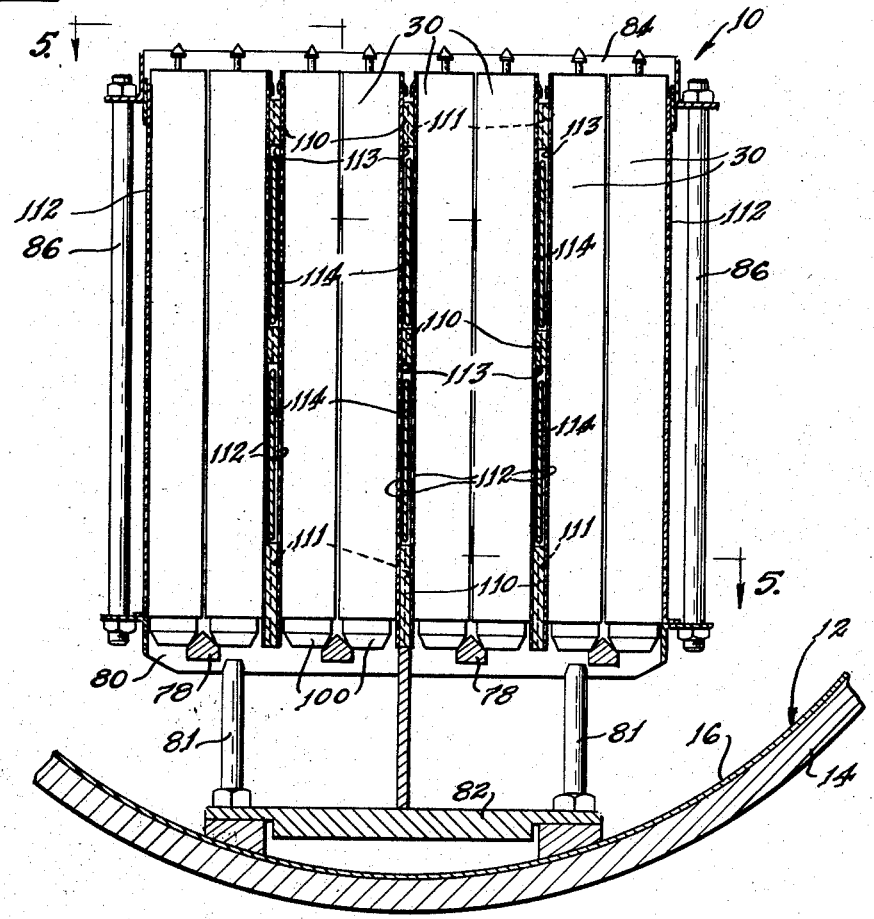
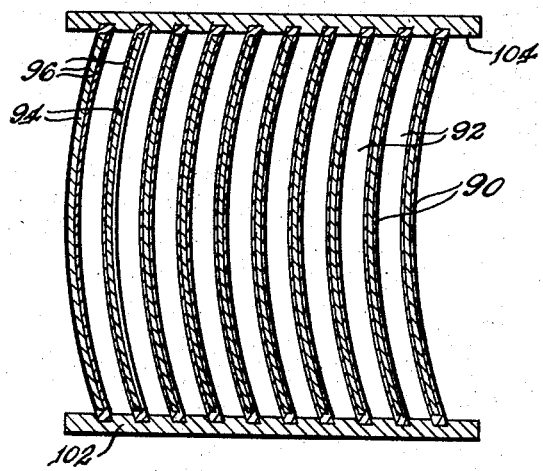
INVENTOR.
Michael Treshow
BY
Roland A. Anderson
Attorney Nov. 18, 1958     M. TRESHOW     2,861,033
HORIZONTAL BOILING REACTOR SYSTEM
Filed April 26, 1956     6 Sheets-Sheet 4
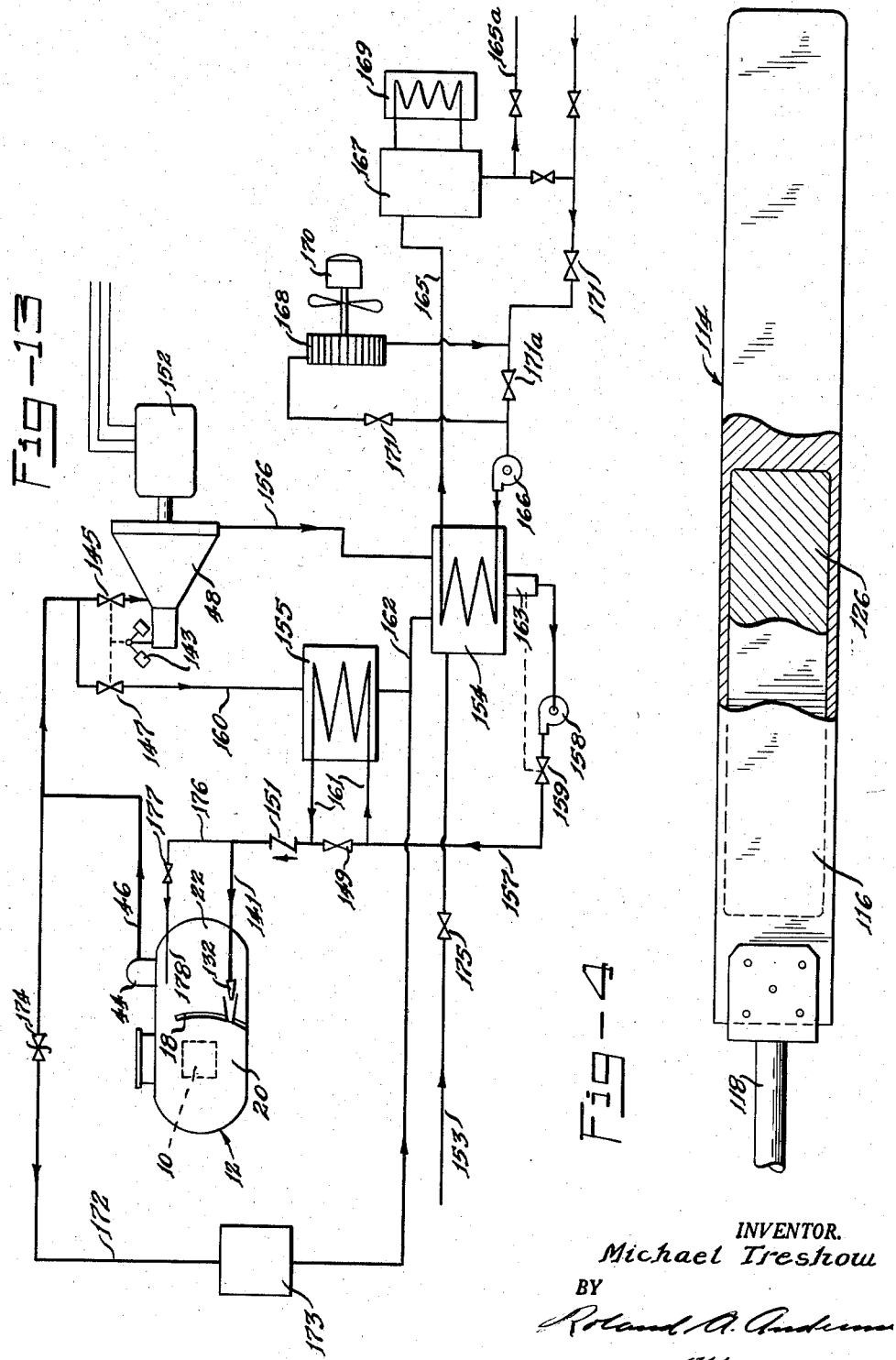
INVENTOR.
*Michael Treshow*
BY
*Roland A. Anderson*
Attorney Nov. 18, 1958 M. TRESHOW 2,861,033
HORIZONTAL BOILING REACTOR SYSTEM
Filed April 26, 1956 6 Sheets-Sheet 5
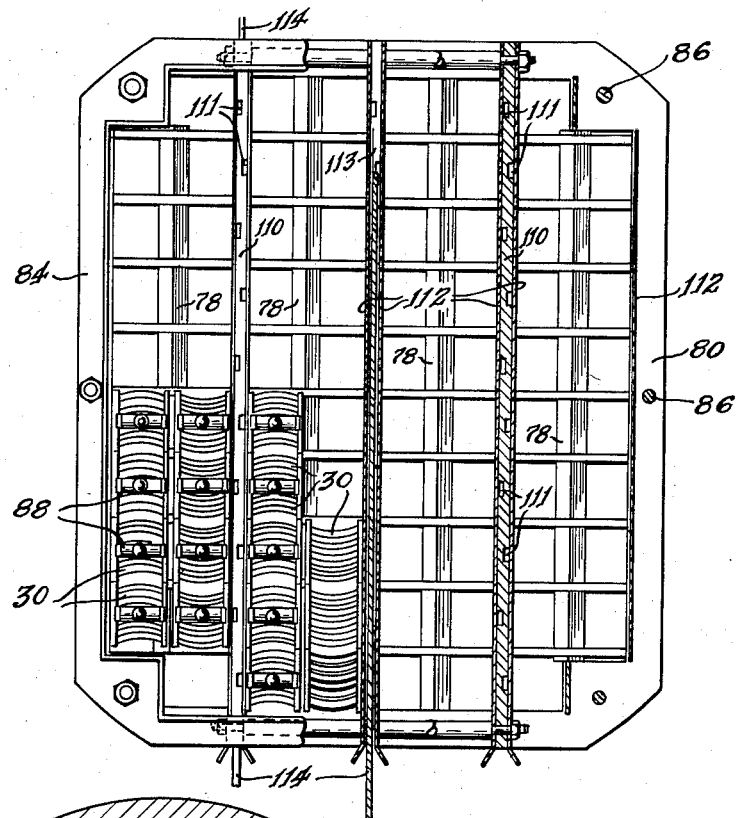
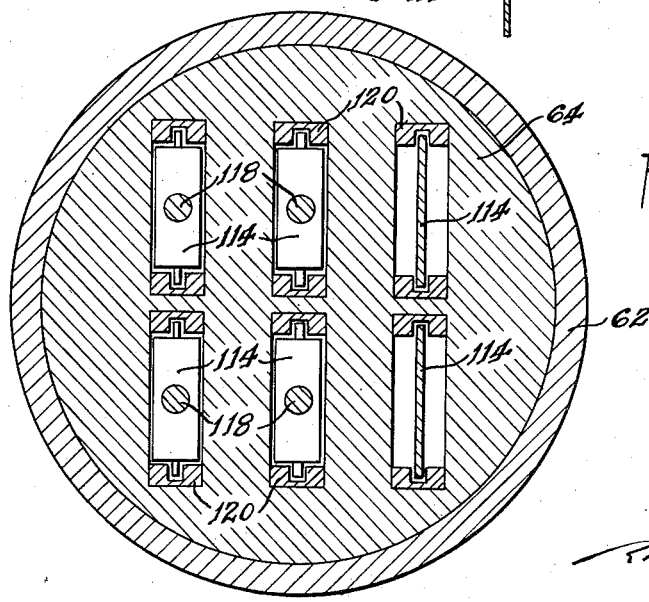
INVENTOR.
Michael Treshow
BY
Attorney Nov. 18, 1958 — M. TRESHOW — 2,861,033
HORIZONTAL BOILING REACTOR SYSTEM
Filed April 26, 1956 — 6 Sheets-Sheet 6

INVENTOR.
Michael Treshow
BY
Roland G. Anderson
Attorney

United States Patent Office 2,861,033
Patented Nov. 18, 1958

2,861,033

HORIZONTAL BOILING REACTOR SYSTEM

Michael Treshow, Hinsdale, Ill., assignor to the United States of America as represented by the United States Atomic Energy Commission Application April 26, 1956, Serial No. 580,965

4 Claims. (Cl. 204—193.2)

This invention relates to neutronic reactors and methods of operating neutronic reactors. More particularly it relates to liquid cooled and moderated power reactors adapted to unmanned operation.

The practicability of a neutronic power reactor, in many applications, is determined by the risks to life and property involved in the event of malfunction in associated auxiliary reactor equipment or malfunction in the reactor proper resulting in an excessive power excursion. Numerous safety devices have been developed and are adapted to neutronic reactors to limit destructive excessive rise in reactor neutron flux. The present invention avoids the necessity of installing auxiliary safety devices in the reactor to limit excessive reactivity within the neutronic core by reason of the inherent large negative temperature and pressure reactivity coefficients attainable in embodiments of the present invention.

Another consideration which limits the practicability of utilizing neutronic power reactors in remote areas, such as, for example, military observation posts located in the Arctic, is the considerable difficulty encountered in transporting all the necessary components of a power reactor to a remote site for final assembly and installation. Embodiments of the present invention are adapted to prefabrication of readily transported subassemblies which may be delivered to the site of final assembly and there quickly assembled to form an operable, safe, power plant.

Power reactor buildings in remote areas subject to severe storms, particularly, for example, in Arctic regions, must be constructed to withstand high winds up to 150 miles per hour, and other severe-climate conditions. Furthermore, in the Arctic it is usually impractical to build structures on conventional foundations. Instead the buildings are placed upon a "mud-sill" foundation which depends upon an even distribution of the building weight upon a number of timber sills placed upon the permanently frozen ground. Moreover, structures to house a power reactor at such sites must be built of materials transported great distances. Accordingly, there is need for a neutronic power reactor and associated electrical generating and space heating equipment adapted to installation as a compact unit having a minimum height, a broad, flat weight distribution, and adapted to utilize materials present in terrain of desolate remote sites to furnish shielding materials and some protection from the elements. Embodiments of the present invention are easily adapted to installation in relatively small, low silhouette, prefabricated buildings, and are designed to utilize material found in the terrain for portions of the necessary protective-radiation shielding.

Heretofore slightly enriched light water-moderated reactors adapted to operate at temperature and pressures which would boil the light water moderator within the core have been built. Reactors of this type have been disclosed in copending application Serial No. 518,427, of Samuel Untermyer, filed June 28, 1955. These so-called boiling reactors have large negative temperature coefficients. When the moderator-coolant water in the core is heated strongly as in a power excursion, it boils violently and throws water out of the core. This increased void space in the core decreases the moderation in the core, and in turn the reactivity of the reactor, thus limiting the extent of the power excursion. However, in previous designs the water-moderator expelled from the core is returned to the core by gravity with very little time lag. Hence with the reactivity of the reactor increased by the returning moderation, the reactor goes supercritical and thus undergoes repeated power excursions, or what is usually referred to as "chugging." The present invention proposes a boiling reactor wherein the water expelled from the core cannot be returned to the core until the reactor vessel temperature and pressure have returned to normal operating range. Accordingly, the present invention discloses a boiling reactor which is inherently safe and which tends to eliminate chugging.

It is generally known in the neutronic reactor art that a suitable reflector disposed about a neutronic reactor core results in a substantial decrease of the minimum critical core size. Earlier efforts to control reactivity of neutronic reaction by changes in the reflector about the core necessitated mechanical means of moving reflector materials into and out of position with respect to the core to increase or decrease neutron reflection back into the core. Such techniques fall short of desirable safety standards because of the possibility of malfunction of the apparatus required to move the reflector and of the time lag inherent in mechanical movements. The present invention circumvents the necessity of auxiliary equipment to alter the reflector about the core by utilizing a moderator and coolant material as a reflector material, and at the same time adapting the reactor vessel to alter the body of light water coolant-moderator-reflector about the reactor core in direct sensitive response to the reactivity of the core.

Therefore, one object of the present invention is to provide an inherently safe neutronic reactor apparatus and method of operation thereof.

Another object of the present invention is to provide a neutronic reactor constructed with prefabricated readily transported subassemblies.

Another object of the present invention is to provide a compact neutronic reactor readily adapted to power a compact steam power system for generating electric power and providing low grade heat for space heaters.

Another object of the present invention is to provide a neutronic reactor adapted for installation in a low building constructed to minimize the damaging effects thereon of severe climate conditions, particularly high winds.

These and other objects and advantages of my invention will be evident from the specification, claims and drawings wherein:

Figure 3 is a sectional view of the neutronic reactor core shown in Figure 1 taken on line 3—3;

Figure 4 is a partly cut away view of the neutronic reactor control rods shown in Figure 1;

Figure 5 is a plan and partial cross sectional view of the neutronic reactor core shown in Figure 3 taken on line 5—5;

Figure 6 is a vertical cross sectional view of the end closure of the neutronic reactor vessel shown in Figure 1 taken on line 6—6;

Figure 9 is a sectional view of the fuel assembly cell shown in Figure 7 taken on line 9—9;

Figure 13 is a schematic diagram of a heat-power system employing a natural circulation neutronic reactor.

Figure 1:
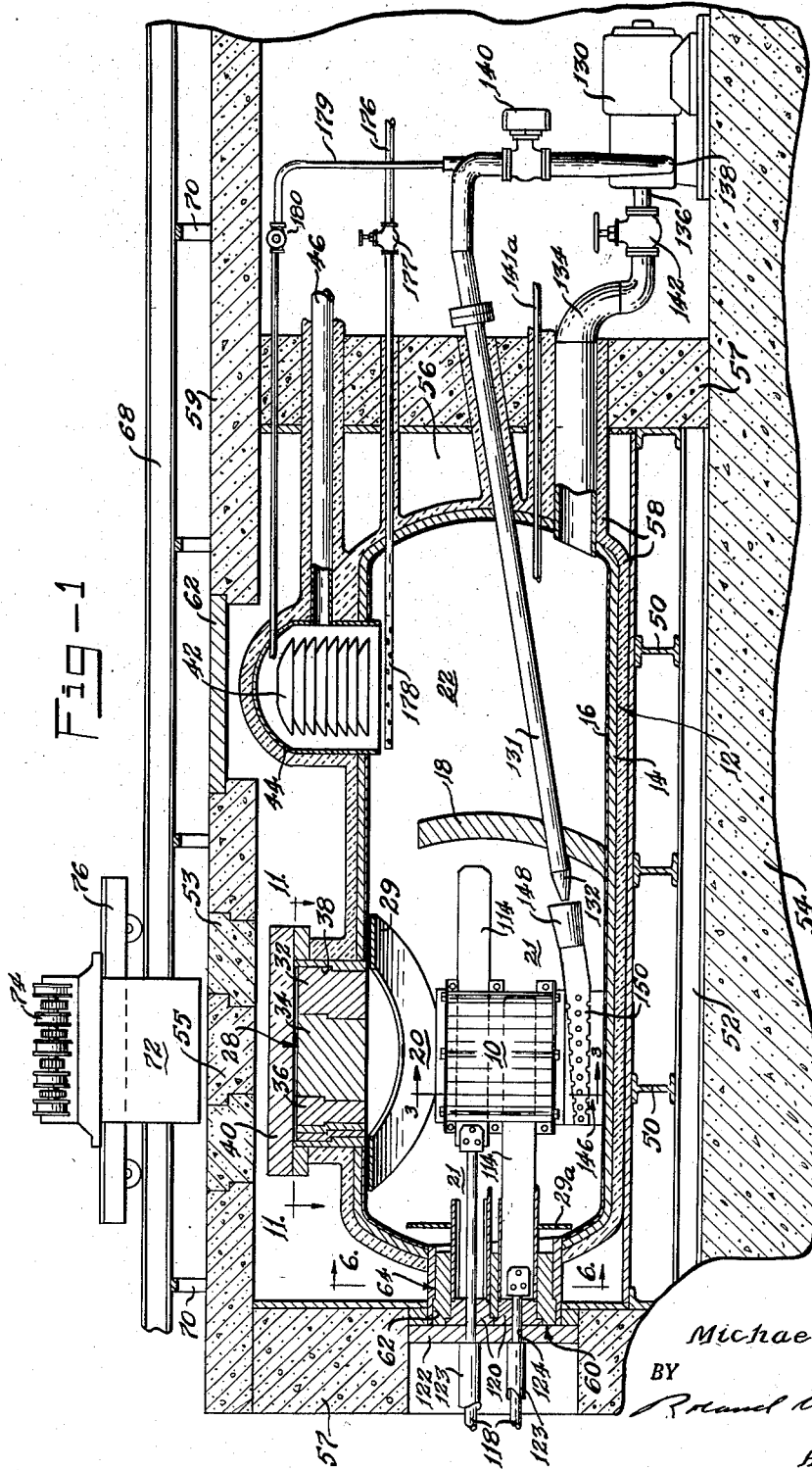
Figure 1 is a longitudinal sectional view of the pressurized circulation neutronic reactor and associated elements.
Figure 11:
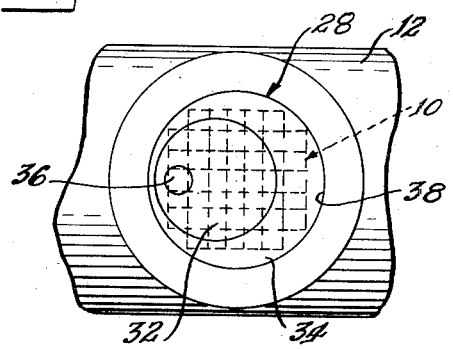
Figure 11 is a partial plan view of the top closure of the neutronic reactor vessel shown in Figure 1.
Figure 10:
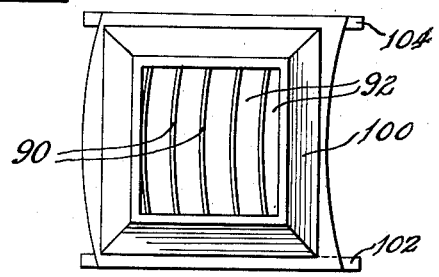
Figure 10 is a bottom view of the fuel cell shown in Figure 7 viewed from line 10—10.

Referring now to the drawings, Fig. 1 which illustrates the pressurized circulation modification of the present invention, shows a cross section view of the reactor core 10 disposed within an elongated cylindrical pressure tank 12. The pressure tank 12 is comprised of a heavy steel shell 14 and an internal stainless steel liner 16. The shell 14 is constructed of a low carbon quenched and tempered constructional alloy steel having a yield strength of 90,000 p. s. i. and a tensile strength of 105,000 p. s. i. such as type T-1. The liner is a corrosion resistant stainless steel such as type 347. A weir 18 divides the tank 12 into two approximately equal compartments, the reactor compartment 20 and the steam compartment 22. The reactor core 10 is positioned approximately in the center of the compartment 20 and so situated that when the longer dimension of the tank 12 is parallel with the earth's surface the uppermost portion of the reactor core 10 will be approximately 2 in. below the top of the weir 18. Immediately above the reactor core 10 in the shell of the pressure tank 12 there is provided a removable plug assembly 28 whereby the individual fuel cell assemblies 30 may be removed from and replaced in the core 10. The removable plug 28 comprises three separate plugs 32, 34 and 36. The plug assembly 28 fits within a circular port 38 in the tank 12. Plug 36 is suspended eccentrically within plug 34 and plug 34 is suspended eccentrically within plug 32, and finally plug 32 is suspended concentrically within the port 38. By rotating the plugs 32, 34 and 36 about their respective centers, access may be gained to each individual fuel cell assembly within the reactor core 10 below the plug assembly 28. Figure 11 illustrates the relationships between the plug assembly 28 and the reactor core 10. A heavy metal shield member 40 is positioned over the plug assembly 28 during operation of the reactor to prevent leakage of steam or radiation from the interior of the pressure tank 12. A plug thermal shield 29 is placed between the reactor core 10 and the outer edge of plug assembly 28. Immediately adjacent and exterior to the tank 12 is a heavy layer of firmly packed stainless steel wool thermal insulating material 58.

Above compartment 22 and integral with the shell 14 of the pressurized tank 12 is a steam separator 42 positioned within a steam dome 44. A live steam pipe 46 connects the output side of the steam separator 42 with the steam turbine 48. The tank 12 is supported on a plurality of steel beams 50 which in turn rest on sills 52. The sills are positioned on a concrete foundation 54. The reactor tank 12 is situated in a vault 56 surrounded by concrete walls 57 and a concrete roof 59. The roof has a steam dome access plug 62 and an outer core access plug 53 and an inner core access plug 55 which provide the principal radiation shielding about the reactor. Provisions are made in the concrete vault for access to the reactor for manipulating the control rods through an end closure 60 at one end of the tank 12 wherein a port 62 is provided for accommodating a control rod plug assembly 64. An end closure thermal shield 29a is provided similar to 29.

Details of the control rod mechanism and the plug assembly 64 will be described below.

Parallel rails 68 supported by brackets 70 which in turn are disposed on the roof 59 of the concrete vault 56 provide a runway for a coffin 72 and a hoist 74 mounted upon a movable dolly 76. The dolly 76 may be positioned immediately above the plug assembly 28 and the reactor core 10 during fuel loading and unloading operations. After loading spent fuel assemblies within the coffin 72 the dolly may be moved along the parallel rail 68 into a storage area remote from the reactor for storing radioactive fuel assemblies.

The core 10 is shown in vertical sectional view in Fig. 3. The core is supported by a plurality of stainless steel grate bars 78 which in turn are held in position by a stainless steel bottom frame 80 supported on legs 81 from a base 82. A stainless steel top frame 84 is positioned about the upper portions of the fuel assemblies 30 and held in fixed relationship with the lower frame member 80 and the grate bars 78 by means of vertical stainless steel tie members 86. The frames can accommodate 76 fuel element assemblies 30 but normally are expected to contain only 72 such elements, namely, four rows of ten and four rows of eight elements. The active section of the core is 60 cm. or 23⅝" high, 27¼" wide, 32⅜" long. The individual fuel cell assemblies 30 are 3⅛" x 3¼" in cross section. Each cell comprises ten fuel plates 90 which are 0.070" thick and 2.8" wide, including the cladding 96. The fuel bearing material 94 is 0.030" thick and is a 94½ weight percent zirconium, and 5½ weight percent $U^{235}$ alloy. Water channels 92 between fuel plates 90 are 0.254" thick. The fuel element assemblies 30 comprise in addition to the fuel plates described above a rectangular base 100 adapted for ready support by the grates 78 as is shown in cross section in Fig. 3. The rectangular base 100 is connected to two parallel plates 102 and 104 which support the individual fuel plates 90 at their respective edges. The parallel plates 102 and 104 are held rigid at the ends opposite the rectangular base 100 by a frame member 88 on to which a lifting pin 106 is attached. The lifting pin 106 is provided with an enlarged head 108 which is readily gripped by a tool lowered from the hoist 74 whereby the individual fuel assembly element may be easily positioned within the core 10 or retrieved therefrom into the coffin 72 and transported to a storage area (not shown).

The reactor core is divided into four sections, each consisting of two rows of fuel element assemblies 30. The sections are separated by ½" thick zirconium spacer bars 110 with ⅛" zirconium perforated plates on each side 112. Between the bars are control plate channels 113 through which the control plates 114 can be moved through the core. The spacer bars 110 have vertical channels 111 therein to permit cooling of these bars 110 and control plates 114. The structural members of the core which are not designated as being zirconium are type 347 stainless steel. The core has sufficient excess reactivity that other substantially equivalent materials can be used from those specified. For example, the uranium may contain as much as 10 weight percent $U^{238}$ content; the zirconium may contain 2½ weight percent tin or be one of the zircalloy alloys which contain as much as 5 weight percent combined strengthening components such as iron, nickel, and chrome, and the type 347 steel may be replaced with equivalent corrosion resistant types.

Total volume of the core is 308 liters. The core is designed to produce 5½ mw. heat power in the natural coolant flow version and to operate under 600 lbs. p. s. i. pressure or 11 mw. heat power in the pressurized version. Accordingly, in the natural coolant flow version a power density of 17.8 kw. per liter of core volume is attainable; considered with reference to the volume of water space in the reactor, a power density of 26.4 kw. per liter is attainable.

The core, control means, tank, etc. are the same in the natural circulation reactor, Fig. 2, and the pressurized circulation version, Fig. 1, with the exception of the components required for the circulation of the water and steam, which will be described later. Although the modifications shown are designed for light water, it will be understood that heavy water can be used by suitable changes in the reactor core.

In the present specification and claims the term "neutronic reactor system" refers to the neutronic reactor, pressure vessel, and reactor appurtenances immediately concerned therewith, the term "power system" refers to the reactor system and the turbine, condensers, etc. concerned with the generation of power.

CONTROL

The reactor core 10 is provided with horizontal control plate channels 113 through which the control plate 114 may be readily moved along a horizontal axis. The control plates are substantially twice the length of the reactor core width. A first end of the plates 116 is rigidly attached to a rod 118. The rod 118 passes through the plug assembly 64. The plug 64 is provided with inner sealing plugs 120 through which the rods 118 slide without loss of pressure within the tank 12. A cap 122 provided with openings 124 which form a further sliding pressure assures a seal about the rods 118. Still a further precaution against loss of water from the pressure tank 12 is provided by the pressure jackets 123 mounted about the rods 118 exterior of the cap 122.

The control plates 114 contain a cadmium sheet 126 or similar control material within the interior disposed therein similar to the meat within a sandwich and extending approximately one-half the length of the steel control rod, positioned in the rod adjacent to the end 116. The cadmium is clad with stainless steel, preferably type 347. When all six of the control rods 114 are inserted their full length into the tank 12, the cadmium sheets 126 will be disposed within the reactor core 10; and when so positioned the six sheets of cadmium contain sufficient thermal neutron absorption cross section to reduce the reactivity, K, of the reactor core to less than unity. The rods 118 terminate beyond the wall 56 and are convenient for an operator to position by hand during startup and shutdown of the reactor. They also may be used as shim controls to compensate for overall loss of reactivity during long-term operation, although normally the feed water control system will also act as shim control.

Figure 2:
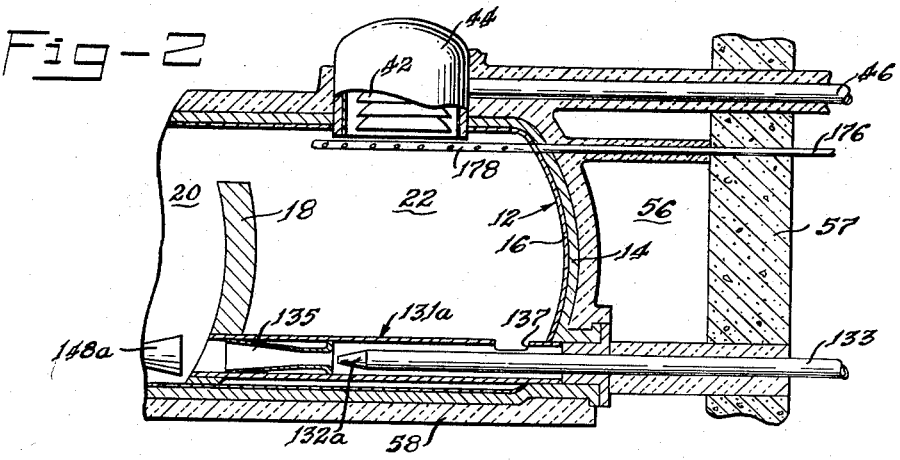
Figure 2 is a partial sectional view of the natural circulation neutronic reactor vessel.

In the natural circulation version illustrated in Figs. 2 and 13, there is a natural convective flow of the water in the reactor compartment 20 upward through the channels 92 and 111 in the reactor core 10 which is identical with that of the pressurized version illustrated in Fig. 1, and down around the sides of the reactor core. In addition to the circulation of the water within the reactor compartment 20 there is a continual flow of water over the top of the weir 18 from the reactor compartment 20 to the steam compartment 22 during operation of the reactor. When the reactor is operating water is being injected into the reactor compartment 20 by an injector pump 131a which comprises feed water pipe 133 terminating in a nozzle 132a and a venturi nozzle 135. Water from the steam compartment 22 enters the injector through opening 137 and is thus forced into the reactor compartment 20.

Under normal conditions the steam developed in the core has ample space to separate from the water before it leaves the reactor compartment 20 which has a free water surface of 28 sq. ft. The circulating water in the downcomer area 21 around the core moves with an average velocity of less than one-half foot per second. Very few bubbles are carried down with this slow stream. The steam passes over the weir 18 with a normal velocity of 1½ ft. per second, together with a certain amount of moisture and overflow water.

The steam compartment 22 serves to remove moisture and impurities from the steam and also helps to equalize fluctuations of the steam pressure. Furthermore, this compartment serves as a water surge tank for the system; the water level can be allowed to surge to a reasonable extent since this will not directly influence the operation of the reactor. The steam moves through the separating compartment with a low velocity of approximately 0.5 ft. per second and the bulk of the moisture particles settle here. The final drying of the steam takes place in the moisture separator 42 in the outlet steam dome 44.

The live steam leaves the steam dome 44 through the live steam pipe 46 and enters the turbine 48 through turbine control valve 145. A standard type of speed regulator 143 is provided for the turbine 48 which maintains the turbine speed essentially constant. A speed control 143 is coupled to the turbine valve 145 and to a bypass valve 147 whereby excess steam is automatically bled to the bypass line 160 and to bypass condenser 155. The exhaust steam from bypass condenser 155 is conveyed to a main condenser 154 through return line 162. The turbine 48 is mechanically coupled to an electric generator 152. The low pressure end of the turbine is connected to the main condenser 154 by means of exhaust line 156 where it is joined to return line 162. The condensate from the main condenser is collected in a hot well 163 and pumped from the hot well by feed water pump 158. The flow of feed water from the pump 158 is controlled by feed water pump valve 159.

The feed water can flow through feed water control valve 149, check valve 151, and feed water inlet pipe 141 into the pressure vessel 12 through injector pump 131a. However, a portion of the feed water can be diverted through the bypass condenser 155 where it is heated by bypass steam from line 160 before it is returned to feed water line 157. An automatic control of reactivity of the reactor is effected by means of the bypass system. If the turbine load decreases or if the steam pressure in line 46 increases more steam is bypassed from turbine 48 through bypass steam line 160 and bypass condenser 155. The temperature of the feed water circulating through the bypass condenser 155 is increased. This warmed feed water as it enters reactor core 10 will commence to boil at a lower position in the core 10 since it is warmer than normal feed water, thus increasing the void space within the core and thus lowering the reactivity of the core and the heat output and automatically controlling the steam production of the reactor in response to the load. The flow of feed water through the bypass condenser 155 can be controlled by feed water bypass valve 149.

Space heating is provided for in the present water steam cycle by utilizing the cooling water in the main condenser 154. The water from the space heating system may be introduced into the condenser 154 by means of the pump 166 at a temperature of 170°, heated to a temperature of 215° F. and thence conveyed by heating line 165 to a heat storage tank 167 and then to a heating system (not shown) through the heating line 165a. An auxiliary space heater 169, which may be oil fired, is provided to serve as a source of heat during reactor shutdown. In the event excess heat is introduced into the main condenser 154 over that required for space heating purposes, evaporation apparatus may be utilized to cool the system. Water flowing from the main condenser 154 may be bypassed from the heating system by means of heating system bypass valves 171 and 171a through an evaporator 168 ventilated by a stream of forced air which is readily controlled by a motor driven fan 170.

Some applications in severely cold climates necessitate taking steps to prevent freezing of the water in the condenser and the lines and pumps. A steam line 172 tapping into the main steam line 46 is connected to the condenser 154 and is adapted to circulate steam and warm water through the thermodynamic cycle bypassing only the turbine 48. A relief valve 174 is provided in the line. An auxiliary steam line heater 173 is also provided in the line to permit heating of the system during periods of reactor shutdown. A feed water makeup line 153 entering feed water makeup valve 175 is provided for introducing makeup water into the system at the main condenser 154.

Provisions are made for condensing the steam in the steam compartment 22 by means of a sprinkler line 176 containing a valve 177 and tapped into feed water inlet pipe 141. The sprinkler line terminates within the steam compartment 22 in a sprinkler head 178. By means of this line cool water from the feed water line may be introduced in a spray in the steam compartment, thus condensing the steam therein.

Figure 12:
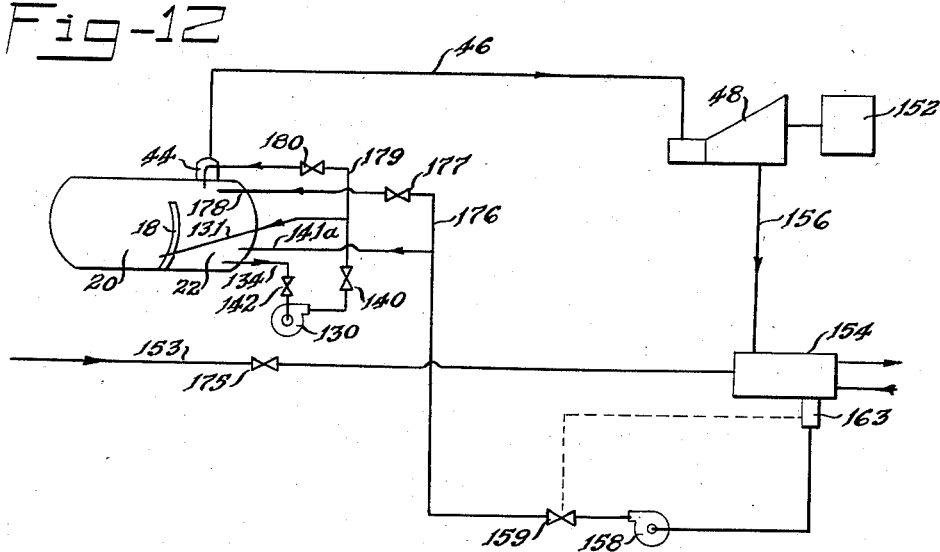
Figure 12 is a simplified schematic diagram of a heat-power system employing a pressurized circulation neutronic reactor.
Figure 7:
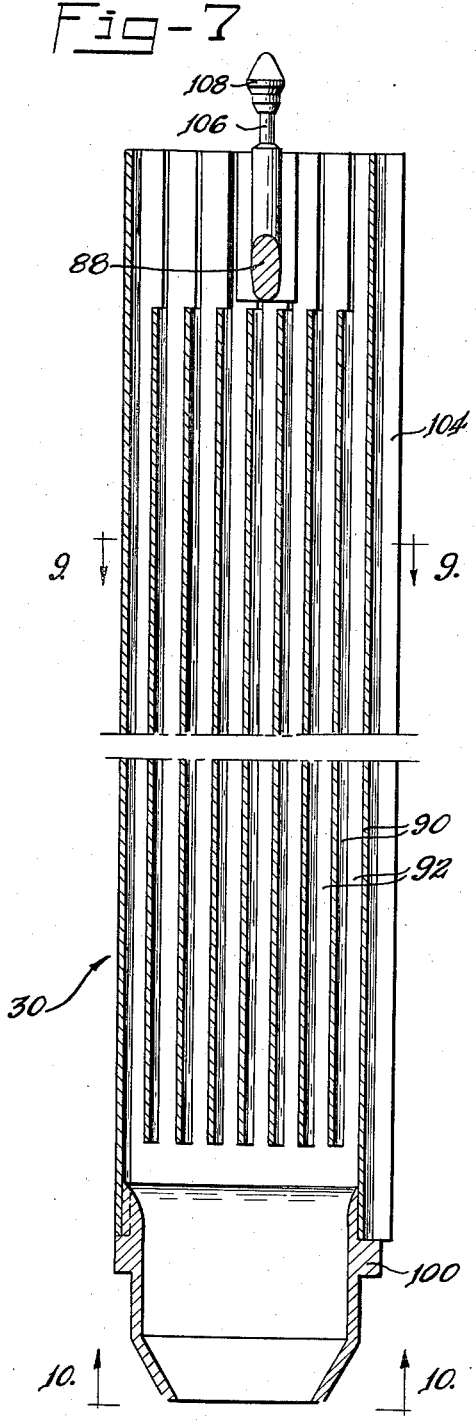
Figure 7 is an elevational view, partly cut away, of a single fuel assembly cell.
Figure 8:
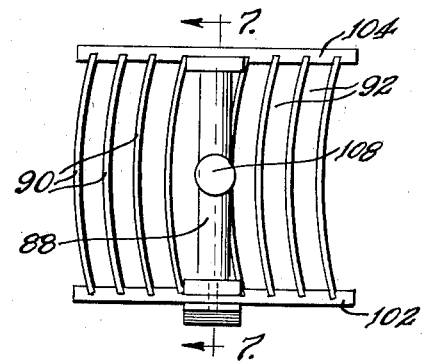
Figure 8 is a top view of the fuel cell shown in Figure 7.

In the pressurized version of the reactor shown in Fig. 1 and schematically in Fig. 12, water is withdrawn from the steam compartment 22 through water withdrawal pipe 134 and passed into the intake side 136 of water circulation pump 130 whereupon it is circulated through the pump and discharged through the discharge side 138 through a pressure regulating valve 140 and into injector 131 which terminates in the reactor compartment 20 in nozzle 132. A gate valve 142 is inserted in the pipe 134 to control volume of water withdrawn from the tank 12. The collector funnel 148 acts as the venturi of an injector and collects not only the water from nozzle 132 but also water from compartment 20 and passes it through the perforated distributor 150 into the plenum box 146. The water then moves upward through the core 10 under pressure. The injector 131 is placed at such an angle that with the pump shut down the water is prevented from siphoning from the reactor compartment through the pumps back to the steam compartment. For this reason a vent pipe 179 with a check valve 180 connects the high point of the loop to the steam dome 44.

The external steam system of the reactor is essentially the same as that of the natural circulation version shown in Fig. 13 with the exception that the steam bypass 160 and feed water bypass 161 are not needed for automatic regulation of the pressurized version and therefore are completely omitted. The reactor is automatically regulated by the pressure regulating valve 140 and pump 130 controlling the flow of water through the reactor core 10. This regulation is based upon the inherent characteristics of boiling reactors. Any given boiling reactor with a given position of its control rods and given pressure and a negative void coefficient will have a reactivity which is inherently regulated by the steam volume entrained in the moderator at any time. The negative void coefficient maintains a constant void volume or a constant ratio of steam production/velocity. Therefore, steam production, or reactor power, is proportionate to the steam velocity. The steam and water velocities in the core (circulating velocities) depend upon equality between pressure losses in the channel and the drive pressure available for the circulation. In the case of natural circulation both the friction losses and the drive pressure are functions of the entrained steam volume, or void percentage ratio; both are of a relatively small magnitude. However, with the forced circulation provided by the pump 130 a liberal drive pressure is provided which can be regulated at will so as to produce and hold any desired fluid velocity (and power level) regardless of the nature of the two-phase friction characteristics and substantially without aid from the control rods. Not only does the pressure circulation system provide an excellent medium for control of the power output but it may also be used to substantially double the capacity of the power output. The capacity of the small boiling reactor is limited by the steam voids, or the rate of steam removal, rather than by the surface heat flux which in the natural circulation version of the present reactor corresponds to an average heat flux of only 31,000 B. t. u./(hr.) (sq. ft.). The liquid velocity of 2.9 at the top end of the cooling channels obtained in the natural circulation reactor is doubled to 5.8 ft. per second in the forced circulation drive. This permits the use of an average heat flux of 62,000 B. t. u. per hour per square foot and a consequent doubling in the reactor power to 11 megawatts.

The dimensions and parameters of the system described are set forth in a table below for purposes of summarizing and expanding the detailed information for the power and heating system.

*Table I*

A. Reactor (natural circulation version):
 (1) Performance—
  Power level, mw _____ 5.5
  Power density in core volume, kw./liter _____ 17.8
  Steam pressure, p. s. i. a _____ 600
  Steam temperature, °F _____ 486
  Steam production, lb./hr _____ 20,000
  Water-steam recirculation rate (through core) _____ 60:1
  Average density reduction of coolant in core due to boiling, percent _____ 14.2
 (2) Core—
  Fuel alloy _____ ZrK+U$^{235}$
  Fuel plates:
   Length, in _____ 32½
   Width, in _____ 27½
   Active height, in _____ 23⅜
  Number of elements (3⅛ in. x 3¼ in. x 23⅜ in.) _____ 72
  Number of plates per element _____ 10
  Total thickness of plates, in _____ 0.070
  Thickness of fuel alloy _____ 0.040
  Thickness of zirconium cladding, in _____ 0.015
  Water channel gap, in _____ 0.254
  Cooling surfaces, sq. ft _____ 620
  Fuel per element, gm. U$^{235}$ _____ 139
  Average heat flux, B. t. u./(hr.) (sq. ft.) _____ 31,000
  Average thermal neutron flux in fuel plates at middle of fuel cycle _____ 2.1×10$^{13}$
  Metal to water volume ratio (total core) _____ 0.48
  Thickness of water reflector above core, in. (cold condition) _____ 2
  Thickness of water reflector below core _____ 9
  Maximum distance core to pressure vessel side, in _____ 15

| | New Charge | At end of cycle |
|---|---|---|
| Total fuel content, kg | 10.0 | 8.0 |
| $k_{eff}$, cold (no xenon) | 1.18 | 1.15 |
| $k_{eff}$, operating temperature, no boiling (equilibrium xenon at full power) | 1.09 | 1.06 |
| $k_{eff}$, boiling at full power, 600 p. s. i. (no xenon) | 1.094 | 1.064 |
| $k_{eff}$, boiling at full power, (equilibrium xenon) | 1.06 | 1.03 |
| Fuel burnout in 12 mos. at 70% operating rate (leaving 0.25 kg. excess burnout fuel), kg | | 1.75 |

(3) Pressure vessel—
  Material: low carbon constructional alloy steel with ⅛ in. stainless steel cladding.
  Tank diameter, I. D., ft _____ 5
  Overall length, ft _____ 17
  Weight, tons _____ 10
B. Power system:
  Total steam flow, lb./hr _____ 20,000
  Turbine power, kw _____ 900
  Generator output, kw _____ 850
  Net electric power, kw _____ 750
  Throttle pressure, p. s. i. a _____ 600
  Turbine exhaust pressure, p. s. i. a _____ 20
  Condensate temperature, °F _____ 228
C. Heating system:
  Utilized heat (4½ mw.), B. t. u./hr _____ 15,400,000
  Hot water temperature, °F _____ 215
  Return water temperature, °F _____ 170
  Circulating water, g. p. m _____ 700
  Condenser—heater surface, sq. ft _____ 1,000

The reactor core is moderated by the water in which it is positioned. Sufficient reactivity is built into the reactor core so that a substantial amount of boiling within the core may be maintained and not result in a decrease in reactivity of the core to a value below unity. A further increment of reactivity is obtained in the present core due to the neutron reflective character of the water surrounding the core. A two-inch layer of water of density 1 is equivalent to an infinite reflector in the present reactor.

The present reactor has a self-limiting power feature and a self-limiting pressure feature which inherently control the reactor and prevents "runway." Now all boiling-type reactors have a self-limiting power feature in that if the reactor commences a power excursion, steam forms at a very rapid rate in the core and expels water from the core and the reflector from above the reactor thus terminating the excursion, since without the moderating effect of the water, reactivity will quickly fall below one. However, in the vertical-type boiling reactor the water is blown into the chamber over the reactor core and by force of gravity drops back again immediately into the reactor core. Now in the horizontal reactor which is the subject of the present invention, a major portion of the water expelled from the reactor channels 92 and 111 and the water moderator directly over the core is blown over the weir 18 and into the steam compartment 22. If 50% of the water is expelled from the channels 92 and 111 in the core 10 the present reactor will shut down under all circumstances. In order for the reactor to again achieve criticality this water must be returned from the steam compartment to the reactor compartment by means of the water injector 131a and this inherently produces a greater time lag before criticality is against reached than in the vertical reactor case, and furthermore the injector rate of flow can be controlled by pressure or temperature limitations to introduce any desired time lag in return of the water to the reactor compartment.

The self-limiting pressure feature of the present reactor is based upon the fact that the normal operating density of the moderator is about 14% lower than the non-boiling, saturated water around the reactor core. The capacity of the injector 131a to return the overflowing water and keep the reactor compartment filled is related to the jet velocity of the amount of feed water being pumped through the injector nozzle. Inherently, if for any reason the feed water flow is reduced, the flow of the return water from the steam compartment 22 to the reactor compartment 20 will also be reduced. The water level around the core 10 will gradually recede and the natural circulating rate will be reduced causing an increase of steam voids and a lower reactivity until the power has adjusted itself downwards and reestablished the normal moderator density. This feature, among other advantages, provides the reactor with a safeguard against excessive steam pressures. If the pressure in the reactor should rise above the predetermined maximum pressure which the feed water pump 158 can produce, the flow through the jet nozzle 132a will cease and no water can be returned to the reactor compartment 20. In the meantime, some water will carry over from the reactor compartment 20 with the steam and some will drain back through the injector into the steam compartment 22, all resulting in a lowering of the water level in the reactor compartment and a decreased steam output, such as described above, until the safe range of pressure has been reached.

Not only does the present reactor possess inherent controls which prevent a reactor runaway, but it also possesses automatic regulating features which are responsive to the power demand and to the pressure within the pressure vessel. The power demand automatic regulating feature is connected with the steam bypass 160. The steam bypass valve 147 is opearted automatically by the turbine governor 143 in case of a change in power demand from the turbine. The steam which is bypassed will be condensed in a bypass condenser or feed water preheater 155. The purpose of this arrangement is not only to preserve heat energy, but also to produce a regulating effect on the reactor power level. A drop in steam demand for the turbine will result in an increase in the amount of steam bypassed through the feed water heater 155, thereby increasing the temperature of the inlet feed water. Consequently, boiling will start at a lower level in the core 10 and the average volume of steam voids in the moderator will be increased. This will effect reductions in reactivity and power level, i. e., steam production, until the normal moderator density has been restored and equality established between steam production and demand.

The automatic reactor regulation based upon pressure is present in the natural circulation reactor and can be used in the forced circulation reactor. The reactor is operated with a constant steam pressure of 600 p. s. i. a. If the pressure rises gradually the increased pressure opens the sprinkler-line valve 177 permitting a portion of the feed water to bypass the injector 131 and enter the steam compartment 22 through the sprinkler head 178. Less water then enters the injector nozzle 132 and the circulation decreases, resulting in a reduced power output such as described above and thus tending to reestablish the correct pressure. The tool spray also tends to condense the steam, thus lowering the pressure. A certain fraction of the water may be bypassed through the sprinkler line even at normal operating pressures.

From the point of view of controlling the reactor by regulating the degree of cooling of the liquid coolant entering the fuel elements, the level of the liquid reflector above the upper extremity of the fissionable material in the reactor is not critical. When the reflector above the fissionable material in the core exceeds two diffusion lengths in thickness, the reflector is for practical purposes infinite. However, changes in the density of the reflector may be utilized to obtain control over the neutronic chain reaction independently of the control achieved by regulating the degree of subcooling of the liquid coolant. By constructing the reactor with a water coolant and reflector and with the upper extremity of the fissionable material no greater than 6 inches below the level of the weir, changes in the density of the reflector above the fissionable material will substantially affect the reactivity of the reactor. As a result, an increase in steam content or temperature of this water reflector will decrease the reactivity of the reactor, since the neutron leakage through this reflector will be increased. The inventor has found that the preferable thickness of the water reflector above the upper extremity of the fissionable material is 4 inches, and this thickness is composed of the top 1⅞ inches of the fuel elements (which contain no fissionable material in this region), and 2⅛ inches of water above the fuel elements.

Now while the present invention has been illustrated by two particular embodiments it is, of course, to be understood that many variations of these embodiments are possible without departing from the scope of the present invention. For example, the heat for the heating system can be supplied by a coil within the steam compartment 22. Alternatively, the heat can be supplied by a separate heat exchanger which would be heated by steam tapped off the main live steam line 46. Nuclear reactors of other sizes, utilizing other fissionable fuel compositions and arrangements, other coolants and moderating fluids, and other similar thermodynamic constants are within the scope of my invention which is set forth in the following claims.

What is claimed is:

1. A neutronic reactor system, comprising a horizontal pressure vessel, containing a weir dividing the pressure vessel into two approximately equal compartments, a thermal neutronic reactor core having vertical coolant passages and capable of being moderated by liquid water in said first compartment disposed so that the weir is capable of maintaining a body of water about said core which will be equivalent to an infinite reflector on all sides of said reactor, a second compartment containing means for removing live steam from said compartment, means for conveying water from said second compartment to said first compartment, said means being responsive to the pressure in said pressure vessel.

2. A reactor power system comprising a horizontal pressure vessel containing a weir dividing the pressure vessel into two approximately equal compartments, a thermal neutronic reactor core having vertical coolant passages and capable of being moderated by liquid water in a first compartment, means for conveying steam from the second compartment to a turbine through a turbine control valve, a bypass steam system responsive to said turbine valve containing a feed water heater, a main condenser, a feed water return pipe terminating in an injector nozzle in said first compartment, and having an injector opening in said second compartment, whereby water can be pumped from said second compartment into said first compartment.

3. A reactor power system comprising a horizontal pressure vessel containing a weir dividing the pressure vessel into a reactor compartment and a steam compartment, a thermal neutronic reactor core having vertical coolant passages and capable of being moderated by liquid water in said reactor compartment, means for conveying steam from the steam compartment to a turbine, a turbine, a condenser, a feed water pump and a feed water return pipe terminating in said steam compartment, a pumping loop connecting the steam compartment with the reactor compartment, and containing a pump responsive to pressure within the pressure vessel and capable of withdrawing water from the steam compartment and introducing it into said reactor compartment.

4. A neutronic reactor system comprising a horizontal pressure vessel having a vertical central weir, dividing the vessel into a steam compartment and a reactor compartment, a neutronic reactor core containing 10,000 grams of $U^{235}$ in a zirconium-uranium fuel alloy and having vertical coolant passages, the reactor being located so that the top of the weir is not more than six inches above the top of said core, means for removing steam from said steam compartment, a feed water return line comprising an injector terminating in the reactor compartment, and containing an opening in the steam compartment, whereby water can be pumped from the steam compartment into the reactor compartment.

References Cited in the file of this patent

UNITED STATES PATENTS

| | | |
|---|---|---|
| 1,886,135 | Tannehill | Nov. 1, 1932 |
| 2,189,443 | Brantly | Feb. 6, 1940 |
| 2,686,249 | Hoague et al. | Aug. 10, 1954 |

FOREIGN PATENTS

| | | |
|---|---|---|
| 588,820 | Great Britain | June 4, 1947 |

OTHER REFERENCES

U. S. Atomic Energy Comm., AECD 3840, by J. R. Dietrich and D. C. Layman, February 1954 (available from Technical Information Service, Oak Ridge Tenn.); pp. 11–20, 40–47, 69, 70, 80, 141, also pp. 76 and 77.

Proceedings of the International Conference on the Peaceful Uses of Atomic Energy, vol. 3, held in Geneva August 8–20, 1955, United Nations, N. Y., 1955, pp. 56–68, 157–168, 283, 284.